WIDE RANGE PHASE SHIFTER

Filed March 9, 1964 2 Sheets-Sheet 1

INVENTOR
BARRY W. POEHLMAN

BY Claude Funkhouser
ATTORNEY

Nov. 22, 1966 B. W. POEHLMAN 3,287,627

WIDE RANGE PHASE SHIFTER

Filed March 9, 1964 2 Sheets-Sheet 2

United States Patent Office 3,287,627
Patented Nov. 22, 1966

3,287,627
WIDE RANGE PHASE SHIFTER

Barry W. Poehlman, Linthicum, Md., assignor, by mesne assignments, to the United States of America as represented by the Secretary of the Navy Filed Mar. 9, 1964, Ser. No. 350,622
2 Claims. (Cl. 323—122)

This invention relates to a phase shift network and, more particularly, to a wide range phase shifter employing transistor circuitry to provide constant gain and phase shift variable over a wide range.

Various phase shift circuits are known in which the input signal is split into a number of components, each of which is shifted by various amounts and then recombined to produce the desired shift. However, these circuits generally are not capable of providing more than a $\pm 90$ degree range. Other circuits are known which are capable of shifting $\pm 180$ degree, but these systems usually employ complicated resistive elements which introduce various errors and distortions into the output signal.

Accordingly, it is an object of the present invention to provide a phase shift circuit which contains only common circuit components.

It is a further object of the present invention to provide a phase shift circuit having a range of greater than $\pm 90$ degree.

It is a further object of the present invention to provide a transistorized phase shift circuit which is compact and does not require the high voltages associated with vacuum tube circuits.

It is a further object of the present invention to provide a phase shift circuit with constant gain and constant optimum loading of the input signal source.

The above objects are accomplished in the present invention by the use of a novel combination of two phase splitters and appropriate filter networks.

Other objects, advantages and novel features of the invention will become apparent from the following detailed description of the invention when considered in conjunction with the accompanying drawings wherein.

Figures 3A, 3B, 3C:
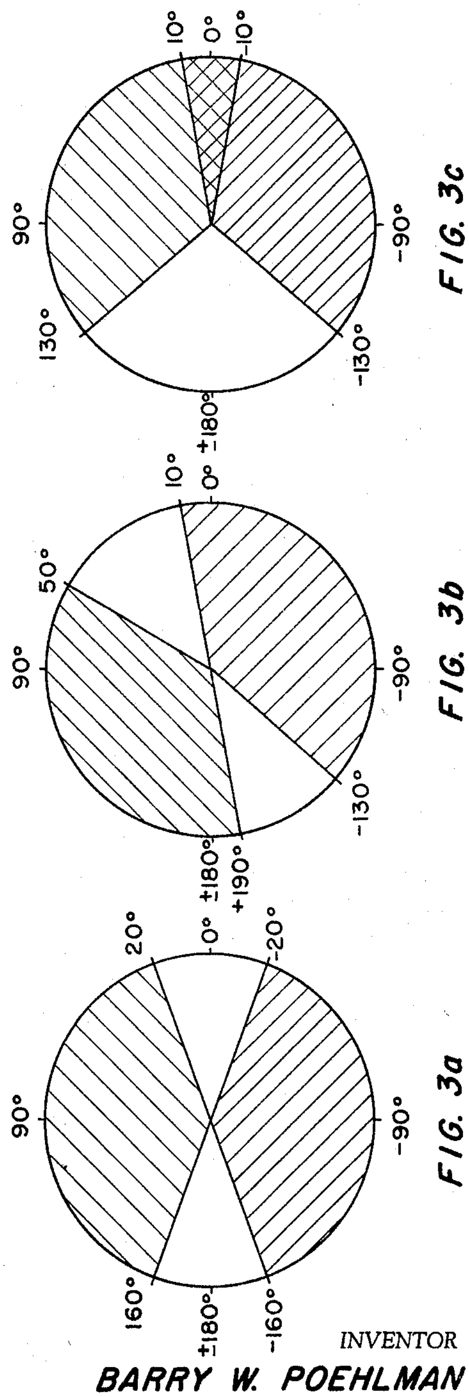
Figure 2:
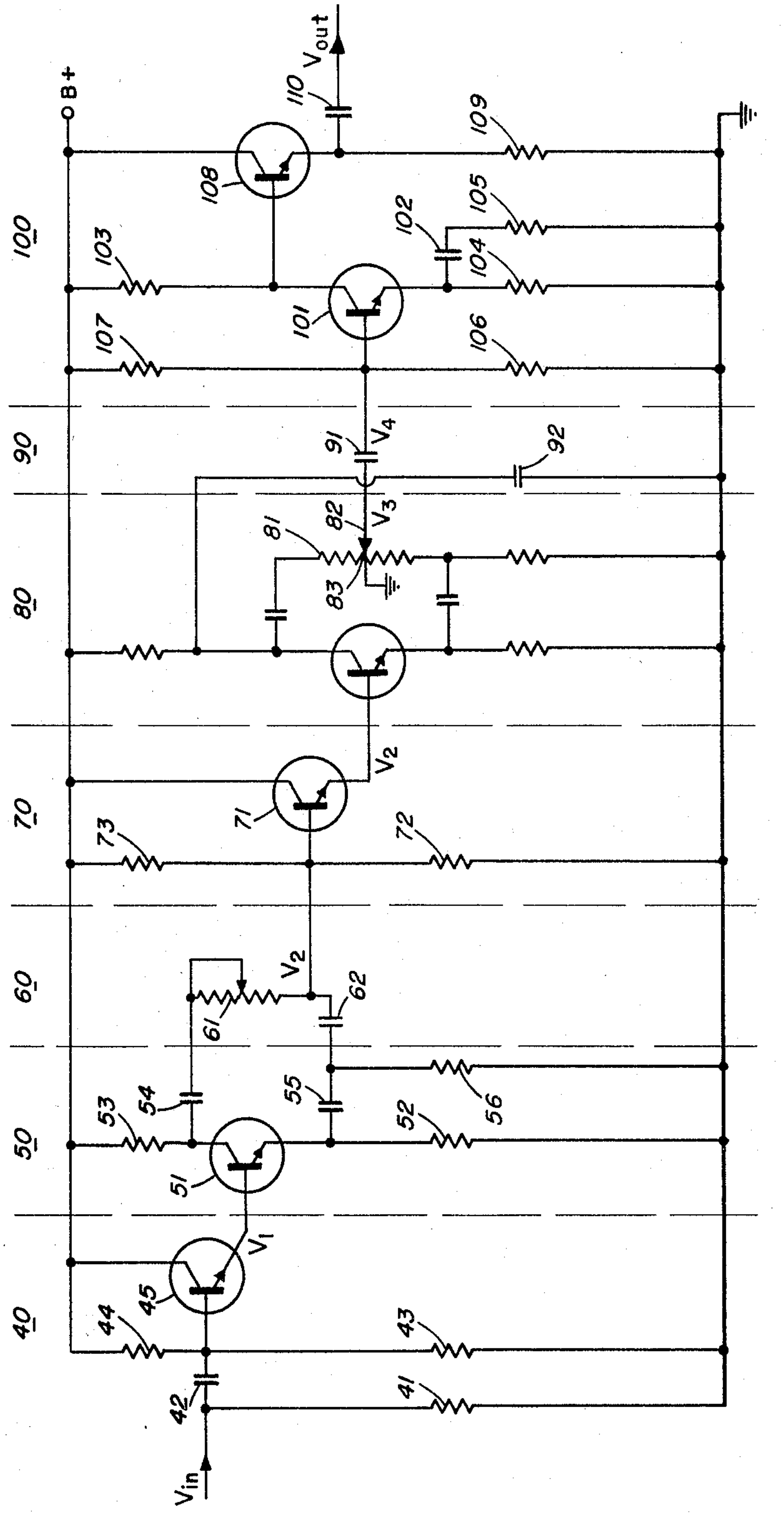
FIG. 2 represents a circuit diagram for the system of FIG. 1.

FIGS. 3*a*–3*c* represent diagrams of the phase shift associated with the circuits of FIG. 2.

Figure 1:
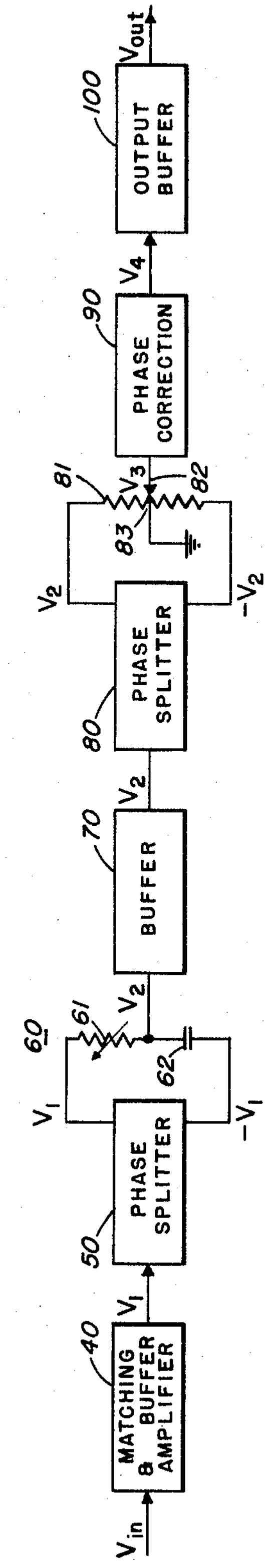
FIG. 1 represents a block diagram of the novel phase shift circuit.

Referring now to FIG. 1, a signal $V_{in}$, whose phase is to be varied, is supplied through a matching and buffer amplifier 40, to a phase splitter 50 and phase shift network 60, consisting of a potentiometer 61 and capacitance 62. The output $V_2$ of the phase shift network 60 varies in phase relative to $V_1$, the phase splitter input, from approximately 0° to —180° and is transmitted with substantially no attenuation. Signal $V_2$ is fed through a buffer 70 to a second phase splitter 80 which is connected to a center tapped potentiometer 81. Leading or lagging phase shift is provided by positioning arm 82 of the potentiometer 81 on the appropriate side of grounded center tap 83. The position of arm 82 relative to grounded center tap 83 determines the magnitude of the output $V_3$. As will be discussed hereinafter, shift network 60 is not capable of providing the full 0° to —180° range of phase shift; accordingly, phase correction network 90 is included to compensate for this.

Signal $V_4$, the output of phase correction network 90, is connected through a buffer 100 to provide a low impedance output signal $V_{out}$.

FIG. 2 shows the preferred embodiment of the system shown in FIG. 1. A matching and buffer stage 40 is provided to properly load the signal source and in the present embodiment resistive coupling is provided by resistor 41 and the input resistance of emitter follower 45. Of course other types of coupling may be employed; use with high frequency signals, for example, might require a different input network. Resistors 43 and 44 provide D.C. bias for transistor 45 while capacitor 42 provides D.C. blocking and is chosen to have negligible impedance at the input signal frequency.

The emitter of transistor 45 supplies the input signal to phase splitter 50 which includes transistor 51, bias resistors 52 and 53, and D.C. blocking capacitors 54 and 55. This circuit provides at its emitter and collector, signals equal in amplitude but opposite in polarity. Resistor 56 is inserted between the output end of capacitor 55 and ground to assure that the amplitude of the two signals are equal. It is of course clear that other forms of phase splitters such as a center tapped transformer could be used to supply the two signals.

Phase shift network 60, including variable resistor 61 and capacitor 62, is connected to the condensers 54 and 55. Theoretically, as the value of resistor 61 is varied from zero to infinity, the phase of voltage $V_2$, the output of the network, with respect to $V_1$, its input, varies from $-180°$ to 0° with no change in signal amplitude according to the relationship $-2 \tan^{-1} RC\omega$, where R and C are the resistance and capacitance of 61 and 62 and where $\omega$ is the input frequency.

A second buffer stage 70, including emitter follower 71 and bias resistors 72 and 73, prevents loading of shift circuit 60.

The emitter of transistor 71 is connected to a second phase splitter 80. The structure and operation are the same as in phase splitter 50, however, the output signals of phase splitter 80 are fed to a center tapped potentiometer 81. Point 83 is connected to ground, accordingly, signals of opposite polarity and equal amplitude are available at corresponding settings of arm 82 on either side of the center tap. Positioning of this arm, therefore, determines both the sense of the phase shift and the amplitude of signal $V_3$.

The theoretical range of signal $V_2$ was stated to be 0° to —180°. However, because of the finite maximum value of resistor 61 and because of other circuit losses present when 61 is set to its minimum value, the phase range of signal $V_2$ is less than its theoretical maximum. In the embodiment shown, this range is —20° to —160°. Accordingly, the phase of the signals on the upper and lower portions of potentiometer 81 varies from +20° to +160° and —20° to —160°, respectively. This is shown by the hatched areas of FIG. 3*a*.

Since it is desirable that 0° phase shift be included within the range of this circuit, it is necessary to decrease the lag of the signals on the lower portion of potentiometer 81 and to correspondingly decrease the lead of the signals on the upper portion.

In the present embodiment, the above is accomplished by the phase correction network 90, including capacitors 91 and 92. Capacitor 91 is inserted in arm 82 and is chosen to add sufficient positive phase shift to bring 0° within the negative phase range. In the present case, approximately 30° of lead is added. This, of course, affects the positive phase as well as the negative range so that (assuming capacitor 92 is not present) the available phase shift varies from +10° to —130° and +50° to +190°, as shown by the hatched areas of FIG. 3*b*.

Finally, in order to close the gap shown in FIG. 3*b*, i.e., to provide phase shift of 10° to 50°, the upper portion of potentiometer 81 is shunted by capacitor 92 to provide a phase lag for the positive phase range. Assuming that the capacitor 92 is chosen to provide 60° lag at the frequency of operation, then the upper portion of FIG. 3*b* is shifted to cover a range of $-10°$ to $+130°$. Since the upper and lower branches are isolated from each other by ground 83, capacitor 92 has no effect on the lower portion of FIG. 3*b*, with the result that phase shift of $-130°$ to $+130°$ is available, as shown in FIG. 3*c*. The output from phase corrector 90, signal $V_4$, is suitably amplified by means of the common emitter stage 101 and is associated circuitry 102–107. Finally, emitter follower 108 and circuitry 109–110 may be added to provide a low output impedance as is well known.

Of course, many modifications of the above described embodiment are possible. For example, since the extent that the available phase shift departs from that shown in FIG. 3*a* is determined by capacitor 91 and 92, considerable latitude in the choice of output characteristics is available without departing from the scope of the invention. Similarly, addition of various switched capacitors could provide extra phase shift in the range $+130°$ to $-180°$.

Finally, while it has been assumed that operation at only one frequency is intended, it is clear that many frequencies may be accommodated by providing variable capacitors for those shown as 62, 91 and 92.

Obviously many modifications and variations of the present invention are possible in the light of the above teachings. It is therefore to be understood that within the scope of the appended claims the invention may be practiced otherwise than as specifically described.

What is claimed is:

1. A phase shift circuit comprising a first phase splitter having two outputs;

a first phase shift network connected to the first phase splitter, said first phase shift network being a series combination of a capacitor and variable resistor connected across both outputs of the first phase splitter, whereby the phase output of the phase shift network varies according to the relation $$-2 \tan^{-1} RC\omega$$

where $\omega$ is the signal frequency and R and C are the resistance and capacitance of the series combination;

a second phase splitter connected to the first phase shift network and having two outputs;

a second phase shift network connected to the second phase splitter, said second phase shift network being a potentiometer having a grounded center tap and having its two ends connected to the two outputs of the second phase splitter whereby positive and negative phase shift is available on opposite sides of the center tap;

means connected to one side of the center tapped potentiometer to introduce a first predetermined phase shift into that side; and means connected to the arm of the potentiometer to introduce a second predetermined phase shift into the output of the potentiometer.

2. A phase shift circuit comprising input means;

first phase splitter means responsive to a signal from the input means to provide first and second signals of equal amplitude, one of which is in phase with the input signal and the other of which is out of phase with the input signal;

phase shift means connected to the first phase splitter and responsive to the first and second signals to produce a third signal variable in phase with respect to the input signal, the said phase shift means being a series combination of resistive and reactive impedances and where one of the impedances is variable from substantially zero impedance to very large impedance, and where the phase of the third signal varies according to the relationship $$-2 \tan^{-1} RC\omega$$

where $\omega$ is the input signal frequency and R and C are the resistance and capacitance of the series combination;

means including a second phase splitter connected to the phase shifter to provide fourth and fifth signals of equal amplitudes, the fifth signal being in phase and the fourth signal being 180° out of phase with the third signal;

means connected to the second phase splitter and responsive to the fourth and fifth signals to produce a sixth signal of selectively variable amplitude and selectively equal in phase to the fourth or the fifth signal;

means to add a phase lead to the sixth signal; and means to add a phase lag to the fourth signal.

References Cited by the Examiner

UNITED STATES PATENTS

| | | | |
|---|---|---|---|
| 2,763,830 | 9/1956 | Pihl | 323—121 |
| 3,017,574 | 1/1962 | Redfern et al. | 323—122 X |
| 3,213,291 | 10/1965 | Reid | 307—88.5 |

JOHN F. COUCH, *Primary Examiner.*

A. D. PELLINEN, *Assistant Examiner.*